United States Patent
Heo

(10) Patent No.: US 9,529,982 B2
(45) Date of Patent: Dec. 27, 2016

(54) METHOD AND APPARATUS TO MANAGE USER ACCOUNT OF DEVICE

(71) Applicant: Samsung Electronics Co., Ltd., Suwon-si (KR)

(72) Inventor: Nam Heo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/773,922

(22) Filed: Feb. 22, 2013

(65) Prior Publication Data
US 2014/0075551 A1 Mar. 13, 2014

(30) Foreign Application Priority Data

Sep. 7, 2012 (KR) .......... 10-2012-0099546
Oct. 22, 2012 (KR) .......... 10-2012-0117508

(51) Int. Cl.
*G06F 21/00* (2013.01)
*G06F 21/30* (2013.01)
*G06F 21/60* (2013.01)
*G06F 21/62* (2013.01)

(52) U.S. Cl.
CPC .......... *G06F 21/30* (2013.01); *G06F 21/608* (2013.01); *G06F 21/629* (2013.01)

(58) Field of Classification Search
None
See application file for complete search history.

(56) References Cited

U.S. PATENT DOCUMENTS

| | | | | |
|---|---|---|---|---|
| 5,715,403 | A * | 2/1998 | Stefik | G06F 21/10 705/44 |
| 5,881,225 | A * | 3/1999 | Worth | G06F 21/62 713/164 |
| 6,006,332 | A * | 12/1999 | Rabne et al. | 726/6 |
| 6,990,684 | B2 * | 1/2006 | Futamura | H04L 9/3268 726/18 |
| 7,017,189 | B1 * | 3/2006 | DeMello | G06F 21/10 713/155 |
| 7,110,984 | B1 * | 9/2006 | Spagna | G06F 21/10 380/201 |
| 7,203,966 | B2 * | 4/2007 | Abburi | G06F 21/10 380/201 |

(Continued)

OTHER PUBLICATIONS

Lee, Deok Gyu; Kim, Geon Woo; Han, Jong Wook; Jeong, Young-Sik; Park, Doo Soon. Smart Environment: Multi-Domain Authentication, Authorization, Security Policy for Pervasive Network. International Symposium on Ubiquitous Multimedia Computing. Pub. Date: 2008. Relevant pp. 99-104. http://ieeexplore.ieee.org/stamp/stamp.jsp?tp=&arnumber=4656525.*

(Continued)

*Primary Examiner* — Jeremiah Avery
(74) *Attorney, Agent, or Firm* — Staas & Halsey LLP

(57) ABSTRACT

A method and apparatus to manage a user account. The method includes: setting a plurality of authorization accounts defining usage right regarding functions of the device; mapping at least one of the plurality of authorization accounts to a user authentication account of the device, based on an input of a user; and executing an application installed in the device using a result of the mapping the authorization account and the user authentication account, without stopping running of an operation system of the device.

18 Claims, 7 Drawing Sheets

(56) References Cited

U.S. PATENT DOCUMENTS

| | | | | |
|---|---|---|---|---|
| 7,815,100 | B2* | 10/2010 | Adams et al. | 235/375 |
| 7,856,657 | B2* | 12/2010 | Moore | H04L 9/32 709/219 |
| 8,041,749 | B2* | 10/2011 | Beck | G06F 19/322 705/1.1 |
| 8,266,674 | B2* | 9/2012 | Huang | G06F 21/6209 713/160 |
| 8,302,185 | B2* | 10/2012 | Little | G06F 21/30 726/21 |
| 8,305,604 | B2* | 11/2012 | McIntyre | G06F 21/608 358/1.15 |
| 8,429,410 | B2* | 4/2013 | Little | G06F 21/62 713/175 |
| 2002/0026574 | A1* | 2/2002 | Watanabe | G06F 21/10 713/155 |
| 2003/0200177 | A1* | 10/2003 | Kugai | G06Q 20/3674 705/51 |
| 2004/0024764 | A1* | 2/2004 | Hsu | G06F 21/31 707/999.009 |
| 2005/0144469 | A1* | 6/2005 | Saitoh | G06F 21/608 713/189 |
| 2005/0268104 | A1* | 12/2005 | Sugishita | H04N 1/0035 713/176 |
| 2007/0076238 | A1* | 4/2007 | Odagiri | G06F 21/608 358/1.14 |
| 2007/0097415 | A1* | 5/2007 | Okamoto | G03G 21/02 358/1.14 |
| 2007/0174454 | A1* | 7/2007 | Mitchell | H04L 63/029 709/225 |
| 2007/0239998 | A1* | 10/2007 | Beck | G06F 19/322 713/193 |
| 2009/0293116 | A1* | 11/2009 | DeMello | G06F 21/10 726/17 |
| 2010/0228996 | A1* | 9/2010 | Ginter | G06F 21/10 713/189 |
| 2010/0287609 | A1* | 11/2010 | Gonzalez et al. | 726/14 |
| 2012/0167162 | A1* | 6/2012 | Raleigh | G06F 21/57 726/1 |

OTHER PUBLICATIONS

Royer, Julio C.; Willrich, Roberto. User Profile-Based Authorization Policies for Network QoS Services. Seventh IEEE International Symposium on Network Computing and Applications. Pub. Date: 2008. Relevant pp. 68-75. http://ieeexplore.ieee.org/stamp.jsp?tp=arnumber=4579641.*

Lorch, Markus; Kafura, Dennis; Fisk, Ian; Keahey, Kate; Carcassi, Gabriele; Freeman, Tim; Peremutov, Timur; Rana, Abhishek Singh. Authorization and Account Management in the Open Science Grid. 6th IEEE/ACM International Workshop on Grid Computing. Pub. Date: 2005. http://ieeexplore.ieee.org/stamp/stamp.jsp?tp=&arnumber=1542719.*

Hayes, Jeff. Policy-based Authentication and Authorization: Secure Access to the Network Infrastructure. 16th Annual Conference Computer Security Applications, ACSAC '00. Pub. Date: 2000. Relevant pp. 328-333. http://ieeexplore.ieee.org/stamp/stamp.jsp?tp=&arnumber=898887.*

Lewis, Dave; O'Donnell, Tony; Feeney, Kevin; Brady, Aoife; Wade, Vincent. Managing User-centric Adaptive Services for Pervasive Computing. Proceedings, International Conference on Automatic Computing. Pub. Date: 2004. http://ieeexplore.ieee.org/stamp/stamp.jsp?tp=&arnumber=1301370.*

Pearlman, Laura; Welch, Von; Foster, Ian; Kesselman, Carl; Tuecke, Steven. A Community Authorization Service for Group Collaboration. Proceedings of Third International Workshop on Policies for Distributed Systems and Networks. Pub. Date: 2002. http://ieeexplore.ieee.org/stamp/stamp.jsp?tp=&arnumber=1011293.*

Huang, Changqin; Wu, Yonghe; Wu, Zhanjie; Zhu, Zhiting. A Unified Access Control Infrastructure Using Attributes and Ontology in E-Learning Resource Grids. 2006 International Conference on Computational Intelligence and Security. vol. 2. http://ieeexplore.ieee.org/stamp/stamp.jsp?tp=&arnumber=4076212.*

* cited by examiner

FIG. 8

| Enter the user name and password.
Ready |

ID: [          ]

Login — 810

Enter the user name and password.
Ready

ID: [          ]

Password: [          ]

Login — 820

Ready
Invalid Username or Password
Create New ID

ID: 910
Night Rider

Password:
Prt0000dk
920

| Features | Selection | | Limitation |
|---|---|---|---|
| | 930 | 940 | 950 |
| All Features | ☒ On | ☐ Off | 2000 |
| Color Copy | ☒ On | ☐ Off | 2000 |
| Mono Copy | ☒ On | ☐ Off | 2000 |
| Fax | ☒ On | ☐ Off | 2000 |

Reset  OK  Cancel

FIG. 10

| List | Name | Function |
|---|---|---|
| 1 | COLOR COPYING A4 | A4, Color print, Scan |
| 2 | A3 MONOPRINT DOUBLE SIDES | A3, mpon print, duplex |
| 3 | A4, FAX, | A4, mono print, Scan |
| 4 | ... | ... |

METHOD AND APPARATUS TO MANAGE USER ACCOUNT OF DEVICE

CROSS-REFERENCE TO RELATED APPLICATIONS

This application claims the benefit of Korean Patent Applications No. 10-2012-0117508 and 10-2012-0099546, filed on Oct. 22, 2012, and Sep. 7, 2012 respectively, in the Korean Intellectual Property Office, the disclosures of which are incorporated herein in their entirety by reference.

BACKGROUND OF THE INVENTION

1. Field of the Invention

The present general inventive concept relates to a method and apparatus to manage a user account required to authenticate a user and limit usage of a device.

2. Description of the Related Art

In a user environment, a plurality of users may commonly use one device. For example, a multi-function peripheral (MFP) provided in an office may perform the operations of printing, scanning, faxing, and copying, according to requests of many users. An administrator may need to limit functions of the MFP for security purposes, such as to prevent leakage of a confidential document, or for management purposes. For example, User A may be limited to using only printing and copying functions 100 times each and User B may be limited to using a faxing function 50 times, according to the users' respective responsibilities. To accomplish this, firmware of the MFP may be programmed to assign 100 uses of each of the printing and copying functions to an identification (ID) of User A and 50 times use of the faxing function to an ID of User B.

In firmware generally, an operating system and an application of the MFP are not separated but instead are realized as one piece of software. Thus, if 100 uses of the printing and copying functions is to be assigned to the ID of User B, firmware itself needs to be replaced. In other words, it is impossible to amend only the application to assign the printing and copying functions to the ID of User B. However, it is technically difficult for a user to personally change the firmware, and it is time consuming and expensive for an MFP manufacturer to change the firmware.

SUMMARY OF THE INVENTION

The present general inventive concept provides an apparatus and method to manage a user account, whereby a change of the user account is applied in real time while a device is operating.

Additional features and utilities of the present general inventive concept will be set forth in part in the description which follows and, in part, will be obvious from the description, or may be learned by practice of the general inventive concept.

Exemplary embodiments of the present general inventive concept provide a method of managing a user account of a device, the method including: setting a plurality of authorization accounts defining usage right regarding functions of the device; mapping at least one of the plurality of authorization accounts to a user authentication account of the device, based on an input of a user; and executing an application installed in the device using a result of the mapping the authorization account and the user authentication account, without stopping running of an operation system of the device.

The present general inventive concept also provides a computer-readable recording medium having recorded thereon a program for executing the method.

The present general inventive concept also provides an apparatus to manage a user account of a device, the apparatus including: an authorization account manager for setting a plurality of authorization accounts defining usage right regarding functions of the device; and a controller for mapping at least one of the plurality of authorization accounts on a user authentication account of the device, based on an input of a user, and executing an application installed in the device using a result of the mapping the authorization account and the user authentication account, without stopping running of an operation system of the device.

The present general inventive concept also provides a method of managing user accounts of an imaging forming apparatus having one or more different functions managed by an operating system, the method comprising: generating one or more authorization accounts, each authorization account having an associated set of rights of use regarding one or more of the functions; creating a first authentication account to verify a user's identity; mapping the first authentication account to at least one of the authorization accounts to create a standard account; verifying a standard account user's identity via the first authentication account without stopping the operating system; and providing the standard account user with access only to the functions designated by the rights of use associated with authorization accounts mapped to the first authentication account without stopping the operating system.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 7 and 8 are diagrams of user interfaces for setting an identification (ID) and a password in a user authentication account, according to an embodiment of the present general inventive concept;

FIG. 9 is a diagram of a user interface for setting an authorization account, according to an embodiment of the present general inventive concept; and FIG. 10 is a table of a list of functions of an application, according to an embodiment of the present general inventive concept.

DETAILED DESCRIPTION OF THE PREFERRED EMBODIMENTS

Figure 1:
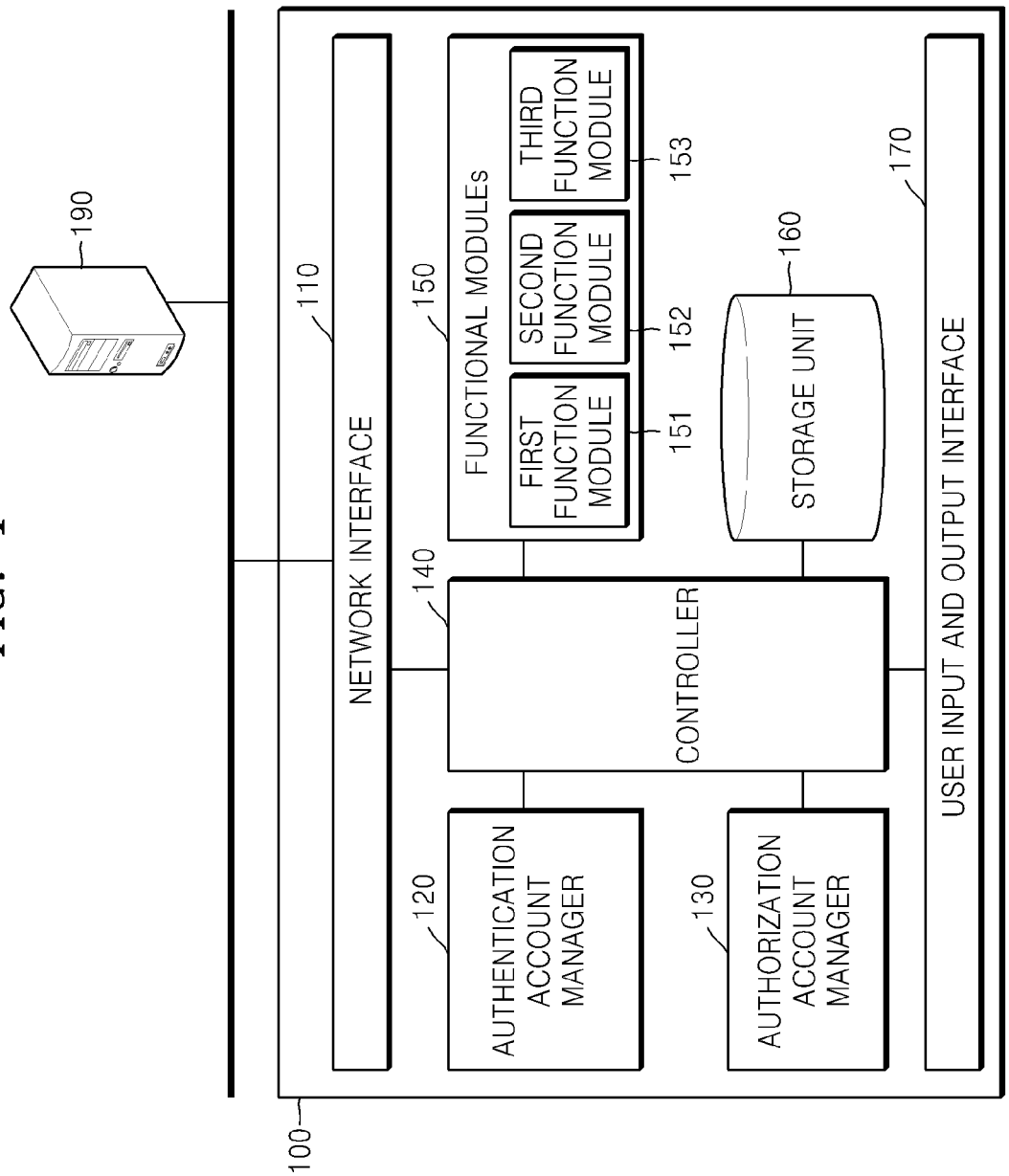
FIG. 1 is a diagram of an apparatus for managing a user account, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram of an apparatus 100 to manage a user account, according to an embodiment of the present general inventive concept. The apparatus 100 manages an account of a user on a predetermined device (not shown), wherein the apparatus 100 and the predetermined device are integrated with each other. However, unlike in FIG. 1, the apparatus 100 may be independently disposed from the predetermined device. The predetermined device is a device having a user account, such as a mobile device, a home device, a computer device, or an image forming apparatus. For convenience of description, it is assumed that the predetermined device is an image forming apparatus. For the purposes of this application and appended claims an image forming apparatus will be defined as a printing, copying, scanning or faxing machine, or multi-purpose combination of the like, as opposed to an ordinary personal computer. The apparatus 100 is integrated into the image forming apparatus.

Referring to FIG. 1, the apparatus 100 includes a network interface 110, an authentication account manager 120, an authorization account manager 130, a controller 140, functional module unit 150, a storage unit 160, and a user input and output interface 170.

The network interface 110 provides an interface for the apparatus 100 to transmit and receive data to and from an external network. As will be described below, the network interface 110 of the apparatus 100 may download applications from an external server 190. Examples of the applications include a functional application to drive the functional module and security applications to provide a user authentication method. Also, the network interface 110 may enable the apparatus 100 to remotely perform user authentication via the external server 190. The network interface 110 may be realized according to a wired or wireless communication standard.

The functional module unit 150 includes functional modules that denote hardware performing functions of the image forming apparatus. For example, functional modules 151, 152, and 153 of the functional module unit 150 may be any of a scanning module, a printing module, a faxing module, or a copying module. Here, one functional module may be a combination of different functional modules. For example the copying module may be a combination of a scanning module and a printing module.

The storage unit 160 stores firmware of the apparatus 100. In other words, the firmware installed in the apparatus 100 is stored in the storage unit 160.

Figure 2:
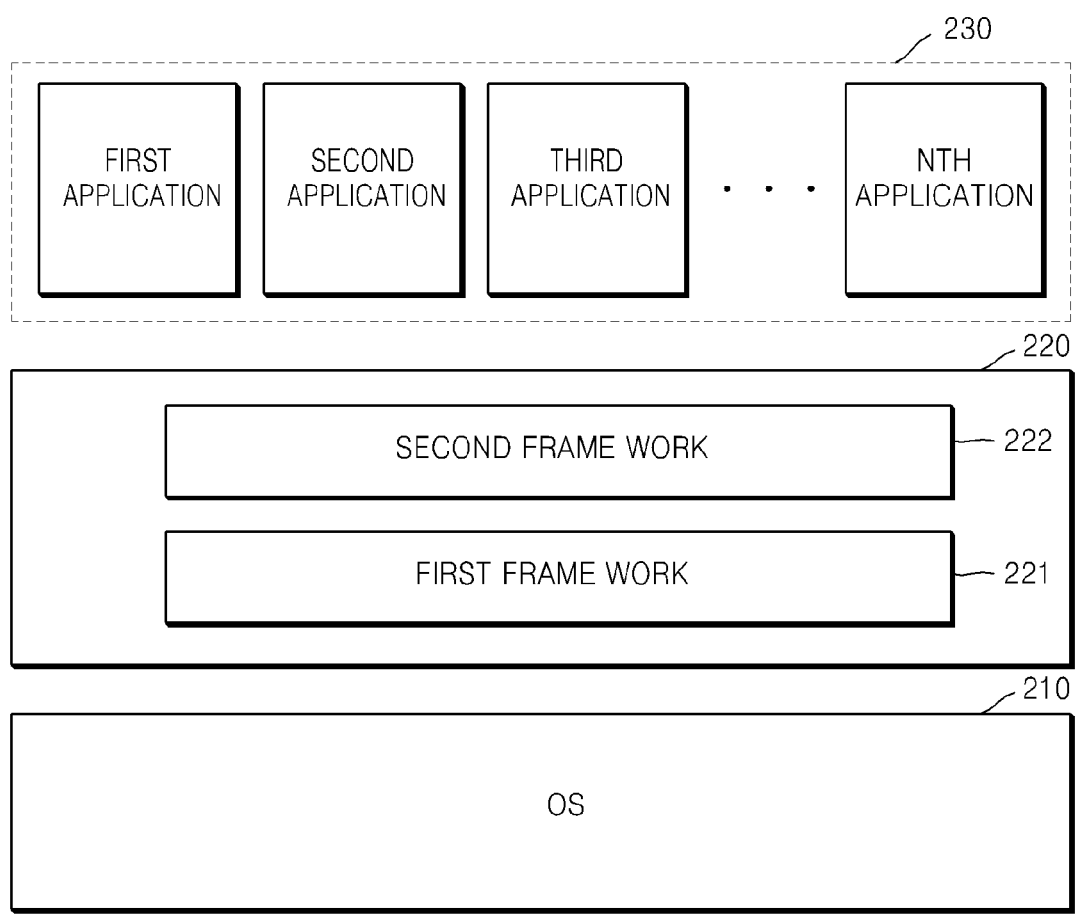
FIG. 2 is a diagram of a hierarchical structure of firmware, according to an embodiment of the present general inventive concept.

As shown in FIG. 2, the firmware may include an operating system 210, a frame work 220, and applications 230. Examples of the applications 230 include a functional application that is software for driving the functional modules 150 of FIG. 1 according to various purposes, and a security application for providing an authentication method for performing user authentication. Moreover, the storage unit 160 of FIG. 1 may store setting information about an authentication account, setting information about an authorization account, and information about a standard account mapping an authentication account and an authorization account, as information about a user account.

The user interface 170 includes an interface for receiving a predetermined command from a user. For example, the user interface 170 may include a key pad, a manipulation button, or a touch pad, or may be an interface that can be connected to a keyboard or a mouse. Also, the user interface 170 may provide a graphic user interface (GUI) to the user. The user interface 170 may include a display device for transmitting a GUI to the user as shown, for example, in FIGS. 5 through 9. Alternatively, the user interface 170 may include an image output interface for providing a GUI image to an external monitor apparatus.

Referring back to FIG. 1, the authentication account manager 120 generates or sets at least one user authentication account based on at least one security application stored in the storage unit 160. When generating or setting the user authentication account, the authentication account manager 120 may generate or set the user authentication account while the operating system 210 of FIG. 2 is running. The apparatus 100 operates as long as the operating system 210 is running, and when the apparatus 100 is rebooted, the operating system 210 is stopped and starts running again.

The user authentication account is an account to identify a user, and different user authentication accounts may be assigned according to different users. The user authentication account is used to identify and authenticate a user, but does not include information about any rights of an authenticated user. In other words, the user authentication account is an account independent from an authorization account to be described later. Accordingly, the user authentication account is used to identify the user, but does not include information about the rights of the user using the functional module 150. Information about the user authentication account may be stored in the storage unit 160.

The authentication account manager 120 performs user authentication according to a setting of the user authentication account and the security application. The authentication account manager 120 performs user authentication according to a request of the controller 140.

The security application stored in the storage unit 160 provides a user authentication method for the authentication account manager 120 to identify the user through the user authentication account. Examples of the user authentication method include a first authentication method using a barcode, a second authentication method using an ID and a password, a third authentication method using a fingerprint, a fourth authentication method using an encoded authentication key stored in a universal serial bus (USB), a fifth authentication method using an iris, and a sixth authentication method using a radio frequency identification (RFID). The apparatus 100 may further include first through sixth authentication modules (not shown) corresponding to the first through sixth authentication methods. In other words, the first through sixth authentication modules may be, for example, a fingerprint scanner for the third authentication method and an RFID reader for the sixth authentication method.

The security application may be used at least according to each of the first through sixth authentication modules. In other words, for example, a second security application for the second authentication method using an ID and a password, a third security application to drive a fingerprint scanner, and a fourth security application for an encoded authentication key may be stored in the storage unit 160. Security applications to perform complex authentication methods may be stored in the storage unit 160. For example, a security application sequentially performing the second and third authentication methods may be stored in the storage unit 160.

Figure 6:
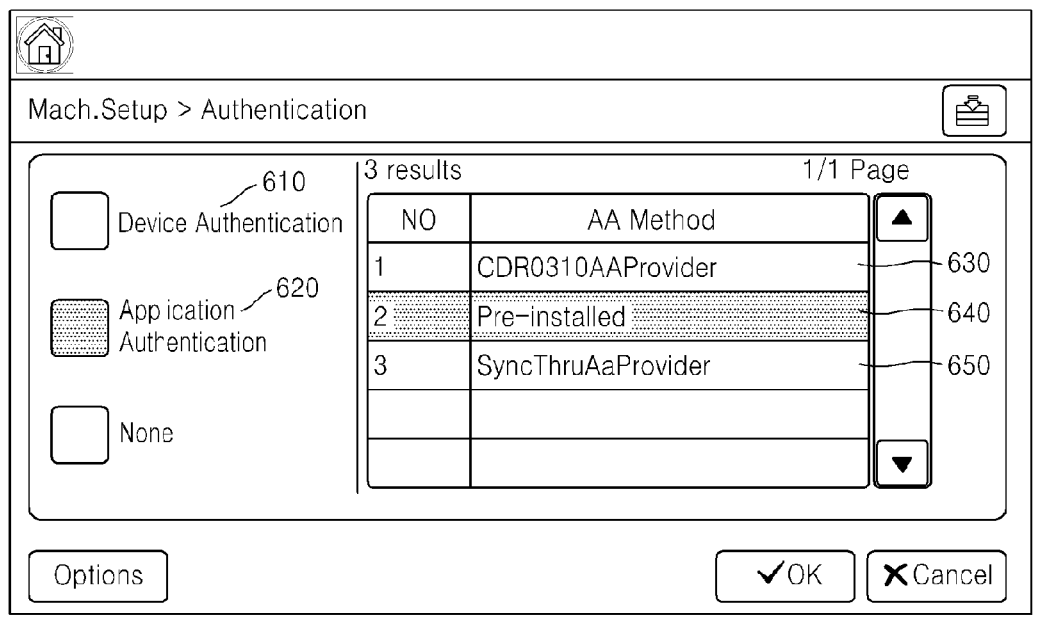
FIG. 6 is a diagram of a user interface for setting a user authentication account, according to an embodiment of the present general inventive concept.

The security application may be provided to the user via a user interface 170 GUI. FIG. 6 shows an embodiment including three security applications 630 through 650 installed in the apparatus 100.

Referring back to FIG. 1, security applications may be downloaded to the apparatus 100 from an external server 190 through the network interface 110. The external server 190 may provide the security applications to the apparatus 100. The controller 140 installs the downloaded security application through the network interface 110. The controller 140 may also remove installed security applications. Referring to an exemplary user interface 170 shown in FIG. 6, security application 630 referred to as 'CDR0310AAPovider' is an application downloaded and installed from the external server 190.

In FIG. 1, the authentication account manager 120 selects at least one of the security applications stored in the storage unit 160, and sets the user authentication account based on the selected security application. As shown in FIG. 6, the authentication account manager 120 selects any one of the security applications 630 through 650 based on an input of the user, and sets the user authentication account.

Figure 7:
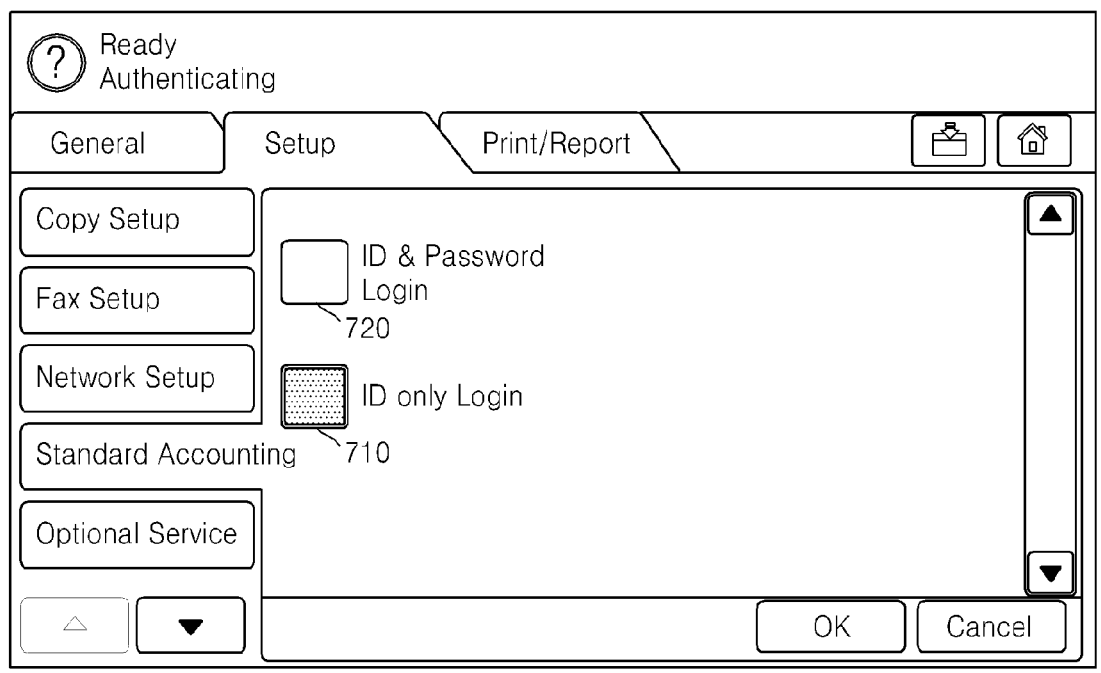

The authentication account manager 120 sets an authentication method with respect to the user authentication account through the security applications. For example, the authentication account manager 120 may select the second security application using an ID and a password, and perform user authentication according to the ID and the password provided by the second security application. Referring to FIGS. 7 and 8, the authentication account manager 120 may select an authentication method using both an ID and password 720 (as shown in FIG. 8, GUI 820) or an authentication method using only an ID 710 (as shown in FIG. 8, GUI 810) according to the authentication method provided by the second security application. The authentication account manager 120 may change an ID and a password by using the second security application, or set a policy regarding an input error of an ID and a password. For example, when the input error of the ID or the password occurs at least three times, the authentication account manager 120 may block the corresponding user authentication account.

Alternatively, for example, the authentication account manager 120 may select the fourth security application using an encoded authentication key stored in a USB, and set an effective date for using the encoded authentication key. The scope of the general inventive concept is not limited to the above embodiments.

The authentication account manager 120 may change the settings of the security application, for example, to switch the authentication method of the user authentication account from one security application to another security application during the runtime of the operating system 210 of FIG. 2. Accordingly, the first security application used for the user authentication may be changed to the second security application. Referring to FIG. 6, the authentication account manager 120 may change the security application 640 that is pre-installed for providing the authentication method to the security application 630 or 650. Here, the authentication account manager 120 may change the authentication method without rebooting the apparatus 100 or changing the firmware of the apparatus 100.

In a general image forming apparatus, it is impossible to change only a setting of an application, since an operating system and the application are stored together in one piece of firmware. However, according to an embodiment of the present general inventive concept, since the frame work 220 acts a medium between the operating system 210 and the applications 230, the setting of the application 230 may be changed or a new application may be installed even when the operating system 210 is running.

The authentication account manager 120 may perform remote authentication by using the external server 190, as well as local authentication as described above. The security application 650 of FIG. 6 referring to SyncThruAAprovider is an application used for remote authentication by using an ID and a password. In other words, the authentication account manager 120 receives an ID and a password of the user from the user, according to an authentication method of the security application 650 of SyncThruAAprovider. Then, referring to FIG. 1, the authentication account manager 120 transmits the ID and the password to the external server 190 through the network interface 110, and receives the result of user authentication from the external server 190.

The authorization account manager 130 generates or sets a plurality of authorization accounts defining usage rights of the user with respect to the functional modules 150. The authorization account manager 130 generates or sets the authorization accounts while the operating system 210 is running. Information about the authorization accounts generated or set by the authorization account manager 130 may be stored in the storage unit 160. The authorization account is an account independent from the user authentication account described above.

The authorization account manager 130 may prohibit use of functional modules 150 such as the scanning module, the copying module, and the faxing module, aside from the printing module of the apparatus 100 through the authorization accounts. Also, the authorization account manager 130 may set usage rights of the functional modules 150 in detail. For example, the authorization account manager 130 may set usage rights of the printing module by allowing the account user to set sizes of printable printing papers, color or mono printing, single or double side printing, printing resolution, and a printable number of pages.

The authorization account manager 130 may receive a selection of all or some of the functional modules 150 from the user through a GUI shown in FIG. 9, and receive a detailed setting value. In FIG. 9, a usage quota 950 is received according to functions as the detailed setting value.

Also, the authorization account manager 130 may set an ID or a password with respect to the authorization account. Since the authorization account is an account independent from the user authentication account, the ID and the password set with respect to the authorization account are independent from an ID and a password of the user authentication account. FIG. 9 illustrates an ID entry box 910 and a password entry box 920 of the authorization account.

When the authorization account manager 130 sets the ID or password with respect to the authorization account, a user has to input the ID or password to change the setting of the authorization account. In other words, the authorization account manager 130 may permit or prohibit access to the authorization account based on the ID or the password.

Referring back to FIG. 1, functional applications for driving the functional modules 150 are installed in the storage unit 160. Examples of the functional applications include a copying function application, a printing function application, a faxing function application, and a scanning function application. The controller 140 may install a new functional application in the storage unit 160 or delete a functional application stored in the storage unit 160. In other words, the controller 140 downloads a new functional application through the network interface 110, for example, an application having an email transmitting function of a scanned document from the external server 190. Then, the controller 140 installs the downloaded functional application in the storage unit 160. The installing of the functional application by the controller 140 will be described in detail later.

The controller 140 maps at least one of the plurality of authorization accounts set by the authorization account manager 130 based on the input of the user to the user authentication account. In other words, the user interface 170 receives a selection of at least one authorization account from the user. Then, the controller 140 maps the at least one authorization account selected by the user to the user authentication account.

If the controller 140 maps two or more authorization accounts to one user authentication account, the controller 140 may assign priorities of the authorization accounts according to a selection of the user. In other words, a first authorization account and a second authorization account may have setting values different from each other. For example, the first authorization account may permit color printing and black and white printing, whereas the second authorization account may permit only black and white printing. In this situation, the controller 140 may receive an input from the user to determine which setting value from among the first and second authorization accounts is to be applied first.

Likewise, a predetermined authorization account may be mapped to the plurality of user authentication accounts. In this situation, a plurality of users receive the same usage right. When the authorization account manager 130 changes a setting value of the predetermined authorization account, the usage rights of the users are changed en bloc.

The controller 140 stores the result of mapping in the storage unit 160, as a standard account. In other words, the standard account is an account in which the user authentication account and the authorization account are mapped to each other. In the standard account, the user authentication account and the authorization account may be independently set or changed. The standard account associates a plurality of IDs and passwords when the authentication account manager 120 performs user authentication by using an ID and a password with respect to the user authentication account and the authorization account manager 130 also set an ID and a password for the authorization account.

The controller 140 may receive a selection of the user regarding the using of the standard account through the user input and output interface 170. Referring to the exemplary GUI shown in FIG. 5, the standard account is activated when the user selects 'Enable' 510 and is deactivated when the user selects 'Disable' 520. When the standard account is deactivated, the apparatus 100 may include information about usage rights in the user authentication account.

The controller 140 reflects the result of mapping, i.e., the user authentication method according to the standard account and the information about the usage rights, for execution of the applications 230 without stopping running of the operating system 210. In other words, 230 while the operating system 210 is running, the controller 140 permits or prohibits the execution of the applications through the frame work 220 between the operating system 210 and the applications 230.

In detail, the controller 140 requests the authentication account manager 120 to perform user authentication through the user authentication account. The authentication account manager 120 transmits the result of the user authentication to the controller 140. In other words, the authentication account manager 120 determines whether the user authentication has succeeded or failed through the authentication account manager 120. When the user authentication has failed, the controller 140 provides a message notifying the failure through the user interface 170. When the user authentication has succeeded, the controller 140 analyzes setting of the authorization account mapped to the user authentication account through the information about the standard account stored in the storage unit 160.

Then, the controller 140 determines whether to permit an execution of an application. The controller 140 receives a list of the functional modules 150 usable by the functional applications from the functional applications. Based on the list, the controller 140 determines whether to permit the execution of the functional application through the authorization account.

For example, in an exemplary embodiment a predetermined authorization account may have the following settings allowed: an A4 size, double-side printing, black and white printing, and a scanning function. FIG. 10 shows an exemplary list of application requests received from a user having an authentication account mapped to the predetermined authorization account. The controller 140 determines to permit execution of the third item with respect to the predetermined authorization account status. On the other hand, the controller 140 prohibits execution of the first and second items with respect to the predetermined authorization account status.

In FIG. 1, the controller 140 installs the downloaded application through the network interface 110. The installed application may be a security application or a functional application. The controller 140 may determine whether the downloaded application is suitable to be installed in the apparatus 100, and installs the downloaded application according to a determination result. For example, when a function performed by the downloaded application is not included in the functional module 150 included in the apparatus 100, the apparatus 140 determines that the downloaded application is not suitable to be installed. Alternatively, the controller 140 determines whether the downloaded application is executable on the frame work 220. In other words, the controller 140 determines whether the downloaded application is suitable to be installed based on whether the downloaded application is generated by an application programming interface (API) provided by the frame work 220.

Furthermore, the controller 140 may obtain the list of functional modules 150 required to execute a new application, and determine whether to permit execution of the new application according to authorization accounts stored in the storage unit 160 based on the list.

FIG. 2 is a diagram of a hierarchical structure of firmware, according to an embodiment of the present general inventive concept. The firmware shown in FIG. 2 is used for driving the apparatus 100. Referring to FIG. 2, the firmware includes the operating system 210, the frame work 220, and the applications 230.

The operating system 210 directly drives hardware of the apparatus 100 according to requests of the applications 230. For example, when a printing request is received from the applications 230, the operating system 210 drives a printing module from among the functional modules 150.

As described above, the applications 230 include functional applications and security applications. The functional applications are applications for performing operations by using the functional modules 150 of the apparatus 100. The security applications are applications providing user authentication methods. The applications 230 may be deleted, installed, or changed while the operating system 210 is running. The applications 230 use an API provided by the frame work 220. The applications 230 transmit and receive data to and from the operating system 210 through the frame work 220.

The frame work 220 is a medium between the operating system 210 and the applications 230. In other words, the frame work 220 arbitrates data exchange between the operating system 210 and the applications 230. Operations requested by the applications 230 are translated into programming languages readable by the operating system 210 through the frame work 220. The frame work 220 may install, delete, or change the applications 230 without stopping the operating system 210. The frame work 220 may include a first frame work 221 and a second frame work 222. The first frame work 221 uses an open type frame work, and the second frame work 222 more suitable to the apparatus 100 may be built on the open type frame work. The first and second frame works 221 and 222 will now be described in detail with reference to FIG. 3.

Figure 3:
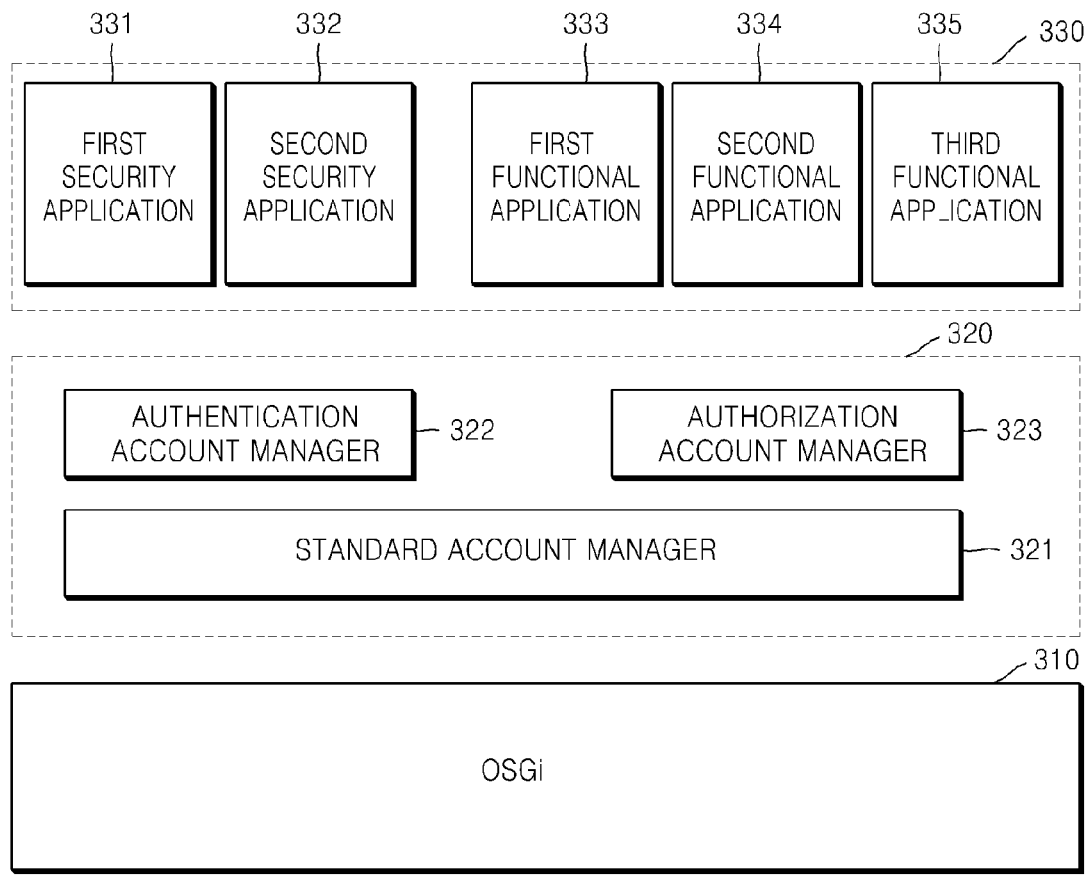
FIG. 3 is a diagram of a structure of a frame work and an application layer in firmware, according to an embodiment of the present general inventive concept.

In FIG. 3, open service gateway initiative (OSGi) 310 denotes the first frame work 221 and a block 320 denotes the second frame work 222. The block 320 includes an authentication account manager 322, an authorization account manager 323, and a standard account manager 321.

The OSGi 310 is a JavaScript-based, open type frame work, and supports functions of remotely installing, starting, stopping, and updating an application during a runtime. In the embodiment shown in FIG. 3, the OSGi 310 is a first frame work 221, but the present general inventive concept is not limited thereto.

The block 320 is a frame work built on the OSGi 310. The authentication account manager 322, authorization account manager 323, and standard account manager 321, respectively, correspond to the authentication account manager 120, authorization account manager 130, and controller 140 of the apparatus 100 of FIG. 1.

Referring back to FIG. 3, the authentication account manager 322 generates or sets user authentication accounts by using one or more security applications 331 and 332. The authentication account manager 322 sets authentication methods of the user authentication accounts to authentication methods provided by the security applications 331 and 332. The authentication account manager 322 may install, delete, and change the security applications 331 and 332 even during the runtime of the operating system 210. The authentication account manager 322 performs user authentication through the setting of the user authentication accounts and the security applications 331 and 332.

The authorization account manager 323 generates or sets the authorization accounts described above. The authorization account manager 323 generates or sets the authorization accounts while the operating system 210 is running.

The standard account manager 321 generates and sets standard accounts by mapping the user authentication accounts generated and set by the authentication account manager 322 and the authorization accounts generated and set by the authorization account manager 323. The standard account manager 321 may map a plurality of user authentication accounts to one authorization account, or a plurality of authorization accounts to one user authentication account.

The standard account manager 321 uses a user authentication method according to the standard account and information about usage rights to execution of the applications 330 while the operating system 210 is running. The standard account manager 321 requests the authentication account manager 322 to perform user authentication through the user authentication account. The standard account manager 321 receives the result of user authentication from the authentication account manager 322. When the user authentication has failed, the standard account manager 321 does not perform an operation requested by the user. When the user authentication has succeeded, the standard account manager 321 determines the user authentication account used for user authentication and the mapped authorization account. The standard account manager 321 determines whether to perform the operation requested by the user based on a list provided by first through third functional applications 333 through 335 and the setting of the authorization account.

Figure 4:
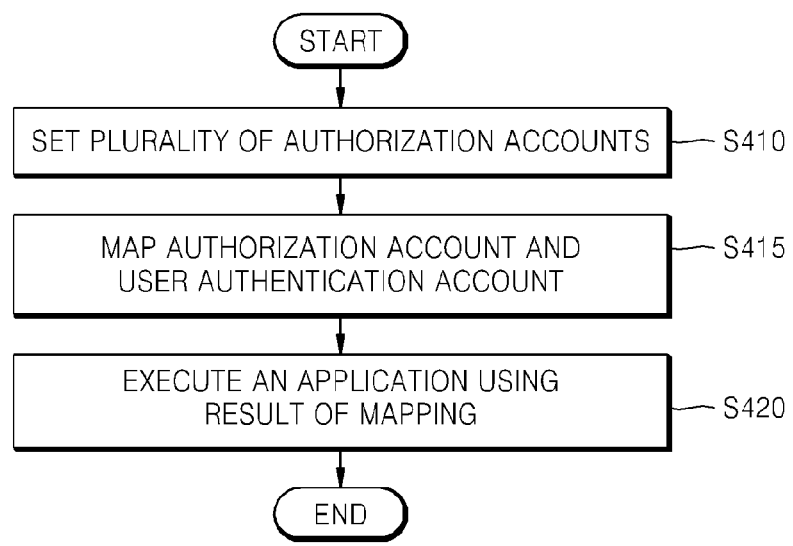
FIG. 4 is a flowchart illustrating a method of managing a user account, according to an embodiment of the present general inventive concept.
Figure 5:
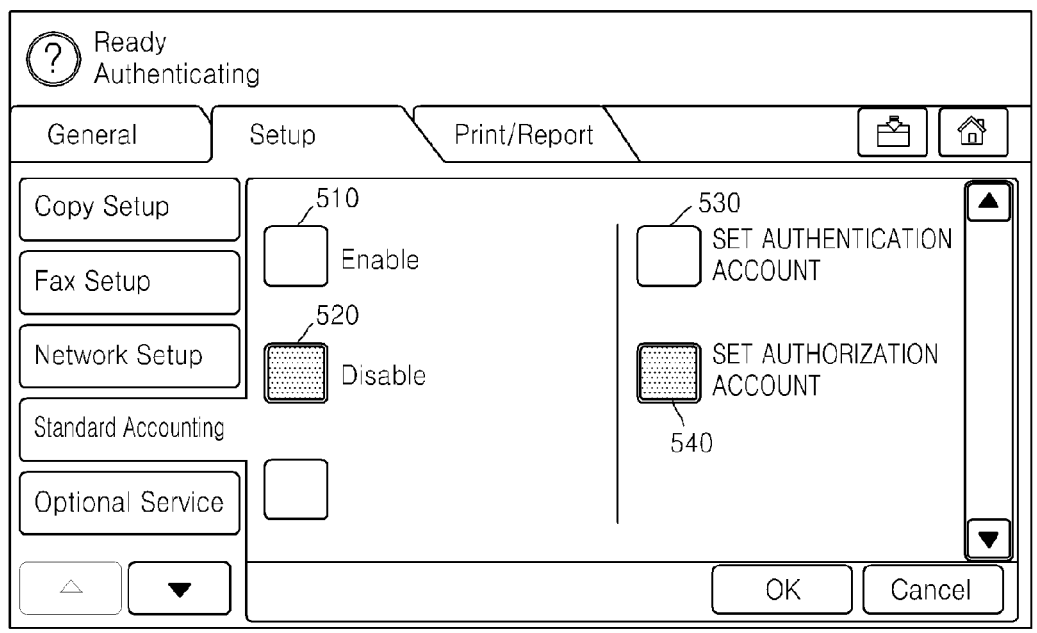
FIG. 5 is a diagram of a user interface for setting a standard account, according to an embodiment of the present general inventive concept.

FIG. 4 is a flowchart illustrating a method of managing a user account, according to an embodiment of the present general inventive concept. Descriptions overlapping with those above are not repeated, and thus descriptions about FIGS. 1 through 3 may be referred to for understanding the method of FIG. 4.

Referring to FIG. 4, first, in operation S410, the apparatus 100 sets a plurality of authorization accounts defining usage rights regarding functions of the apparatus 100. In other words, the apparatus 100 generates or sets the authorization accounts defining usage rights regarding the functional modules 150 while the operating system 210 is running. The generated or set authorization accounts may be stored in the apparatus 100. The apparatus 100 may receive a selection of all or some of the functional modules 150 from the user through the GUI of FIG. 9, and may receive detailed setting values as described above. In FIG. 9, the limitations 950 are received according to functions as detailed setting values of the functions. The apparatus 100 may set an ID or a password with respect to the authorization account. Since the authorization account is an account independent from a user authentication account, the ID or password set with respect to the authorization account is independent from an ID or password of the user authentication account. FIG. 9 illustrates the ID entry box 910 and the password entry box 920 of the authorization account.

Then, in operation S415, the apparatus maps at least one of the authorization accounts to one or more user authentication accounts based on an input of the user. The apparatus 100 receives a selection of at least one authorization account from the user. Then, the apparatus 100 maps the at least one authorization account selected by the user to one or more user authentication accounts. When two or more authorization accounts are mapped to one user authentication account, the apparatus 100 may assign priorities to the authorization accounts according to a selection of the user. Alternatively, a predetermined authorization account may be mapped to the plurality of user authentication accounts. When the apparatus 100 changes a setting value of the predetermined authorization account, usage rights of a plurality of users are changed en bloc. The apparatus 100 may store the result of mapping as a standard account.

In operation S420, the apparatus 100 uses a user authentication method according to the result of mapping and information about the usage rights to execute the applications 230 while the operating system 210 is running. The apparatus 100 permits or prohibits the execution of the applications 230 through the frame work 220 as the medium between the operating system 210 and the applications 230 while the operating system 210 is running. The apparatus 100 receives a list of functions used by the applications 230 from the applications 230. Based on the list, the apparatus 100 determines whether to permit execution of a functional application through the authorization account.

According to the method according to an embodiment of the present general inventive concept, since a change of a user account may be applied in real time while a device is operating, the user account may be easily and quickly amended without having to reboot the device. Also, a manufacturer of the device may simply amend firmware of the device according to the user's environment, without having to make new firmware.

The embodiments of the present general inventive concept can be written as computer programs and can be implemented in general-use digital computers that execute the programs using a computer readable recording medium. Also, a data structure used in the embodiments of the present general inventive concept may be recorded on the computer readable recording medium via any method. Examples of the computer readable recording medium include magnetic storage media (e.g., ROM, floppy disks, hard disks, etc.), optical recording media (e.g., CD-ROMs, or DVDs), etc.

While this general inventive concept has been particularly shown and described with reference to embodiments thereof, it will be understood by those of ordinary skill in the art that various changes in form and details may be made therein without departing from the spirit and scope of the general inventive concept as defined by the appended claims. The embodiments should be considered in a descriptive sense only and not for purposes of limitation. Therefore, the scope of the general inventive concept is defined not by the detailed description of the general inventive concept but by the appended claims, and all differences within the scope will be construed as being included in the present general inventive concept.

What is claimed is:

1. A method of managing a plurality of user accounts of an image forming apparatus including a printing function, the method comprising:
   setting a plurality of authorization accounts defining at least one of a plurality of usage rights regarding at least one of a plurality of functions of the image forming apparatus;
   identifying a user by verifying a user authentication account of the image forming apparatus;
   determining at least one of a plurality of functions allowable to the identified user of the verified user authentication account according to a result of a mapping at least one of the set plurality of authorization accounts to the verified user authentication account;
   obtaining, from an application, a list of one or more functions of the image forming apparatus required to execute the application;
   determining whether executing the application installed in the image forming apparatus is permitted based on a comparison of the obtained one or more functions in the list to the functions determined as allowable in the user authentication account; and
   if the execution of the application is permitted, executing the application,
   wherein more than one of the set of plurality of authorization accounts are mapped to a same one of the verified user authentication accounts,
   wherein usage rights associated with a first authorization account of the set of plurality of authorization accounts mapped to the same one of the verified user authentication accounts are given priority over usage rights associated with a second authorization account of the set of plurality of authorization accounts mapped to the same one of the verified user authentication accounts.

2. The method of claim 1, further comprising setting at least one user authentication account based on at least one security application installed in the image forming apparatus.

3. The method of claim 2, wherein the setting of the at least one user authentication account comprises:
   downloading a predetermined security application to provide the user authenticating method;
   installing the predetermined security application while an operating system is running; and
   setting an authentication method of the at least one user authentication account according to an authentication method provided by the predetermined security application.

4. The method of claim 2, wherein the setting of the at least one user authentication account comprises changing a security application set to provide an authentication method of the at least one user authentication account to another security application while an operating system is running.

5. The method of claim 1, wherein the setting of the plurality of authorization accounts comprises:
   selecting, by the user, one or more functions of the image forming apparatus; and
   receiving, from the user, a usage quota for the selected functions of the image forming apparatus.

6. The method of claim 5, wherein the setting of the plurality of authorization accounts further comprises:
   permitting an access to a predetermined authorization account from among the plurality of authorization accounts based on inputs of an identification (ID) and password of the user; and
   changing a setting value of the predetermined authorization account accessed by the user based on the result of selecting the one or more functions and the usage quota while an operating system is running.

7. The method of claim 5, wherein the setting of the plurality of authorization accounts further comprises generating a new authorization account based on the result of selecting the one or more functions and the usage quota while an operating system is running.

8. The method of claim 1, further comprising:
   receiving a new application via a remote user interface provided by a frame work between the operating system and the application; and
   installing the new application while an operating system is running.

9. An apparatus to manage a a plurality of user accounts of an image forming apparatus having a printing function, the apparatus comprising a controller configured to:
   set a plurality of authorization accounts defining at least one of a plurality of usage rights regarding at least one of a plurality of functions of the image forming apparatus;
   identify a user by verifying a user authentication account of the image forming apparatus;
   determine at least one of a plurality of functions allowable to the identified user of the verified user authentication account according to a result of mapping at least one of the set plurality of authorization accounts on the verified user authentication account;
   obtain, from an application, a list of one or more functions of the image forming apparatus required to execute the application;

determine whether executing the application installed in the image forming apparatus is permitted based on a comparison of the obtained one or more functions in the list to the functions determined as allowable in the user authentication account, and execute the application if the executing of the application is permitted, wherein more than one of the set of plurality of authorization accounts are mapped to a same one of the verified user authentication accounts, wherein usage rights associated with a first authorization account of the set of plurality of authorization accounts mapped to the same one of the verified user authentication accounts are given priority over usage rights associated with a second authorization account of the set of plurality of authorization accounts mapped to the same one of the verified user authentication accounts.

10. The apparatus of claim 9, the controller further configured to set at least one user authentication account based on at least one security application installed in the image forming apparatus.

11. The apparatus of claim 10, further comprising a network interface to download a predetermined security application providing the user authenticating method through a network, wherein the controller installs the predetermined security application while an operating system is running, and the controller sets an authentication method of the at least one user authentication account according to an authentication method provided by the predetermined security application.

12. The apparatus of claim 10, wherein the controller changes a security application set to provide an authentication method of the at least one user authentication account to another security application while an operating system is running.

13. The apparatus of claim 9, wherein the controller selects, by the user, one or more functions of the image forming apparatus, and receives, from the user, a usage quota for the selected one or more functions of the image forming apparatus, to set an authorization account.

14. The apparatus of claim 13, wherein the controller permits an access to a predetermined authorization account from among the plurality of authorization accounts based on inputs of an identification (ID) and password of the user to change a setting value of the predetermined authorization account accessed by the user based on a result of selecting the one or more functions and the usage quota while an operating system is running.

15. The apparatus of claim 13, wherein the controller generates a new authorization account based on the result of selecting the one or more functions and the usage quota while an operating system is running.

16. The apparatus of claim 9, further comprising a network interface to receive new applications via a remote user interface provided by a frame work between the operating system and the application, wherein the controller installs the new applications while an operating system is running.

17. The method of claim 1, wherein a plurality of user authentication methods comprise at least two of a fingerprint scan, using a barcode, using an encoded key in a universal serial bus, an iris scan, a radio frequency identification, and using a username and a password.

18. The apparatus of claim 9, wherein a plurality of user authentication methods comprise at least two of a fingerprint scan, using a barcode, using an encoded key in a universal serial bus, an iris scan, a radio frequency identification, and using a username and a password.

* * * * *